(12) United States Patent
De Los Santos et al.

(10) Patent No.: US 7,499,283 B2
(45) Date of Patent: Mar. 3, 2009

(54) KEY FOB FOR AN AUTOMOBILE

(75) Inventors: Ernesto De Los Santos, Juarez (MX); Richard A. Mays, El Paso, TX (US); Umeshkumar R. Patel, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 801 days.

(21) Appl. No.: 10/902,672

(22) Filed: Jul. 29, 2004

(65) Prior Publication Data

US 2006/0023442 A1    Feb. 2, 2006

(51) Int. Cl.
    *H05K 5/00*    (2006.01)
(52) U.S. Cl. ........................... 361/752; 361/730
(58) Field of Classification Search ............... 70/408; 341/176; 362/201, 408; 235/472.02; 361/752, 361/730

See application file for complete search history.

(56) References Cited

U.S. PATENT DOCUMENTS

| | | | | |
|---|---|---|---|---|
| 6,016,676 A | * | 1/2000 | McConnell | 70/408 |
| 6,433,728 B1 | * | 8/2002 | Krupp et al. | 341/176 |
| 6,799,862 B2 | * | 10/2004 | Galli | 362/201 |
| 2004/0231474 A1 | * | 11/2004 | Bier et al. | 83/13 |

\* cited by examiner

*Primary Examiner*—Dean A. Reichard
*Assistant Examiner*—Andargie M Aychillhum
(74) *Attorney, Agent, or Firm*—Jimmy L. Funke

(57) ABSTRACT

A key fob for keyless entry into an automobile includes a substantially rigid housing having an outer surface with a ridge or a recess. Signal transmission circuitry is disposed within the housing and is operable to transmit a signal to the automobile. A flexible shell includes a cavity in which the housing is at least partially received. A rim is engaged with the ridge or recess of the housing such that the shell is secured to the housing.

16 Claims, 3 Drawing Sheets

KEY FOB FOR AN AUTOMOBILE

TECHNICAL BACKGROUND

This invention relates generally to remote keyless entry key fobs, and, more particularly, to a novel remote keyless entry key fob for an automobile.

BACKGROUND OF THE INVENTION

Key fobs are known in the art for remotely transmitting a radio frequency signals to an automobile. Such signals may instruct the vehicle to lock or unlock its doors, open a trunk compartment, sound the horn, or start the engine, for example.

Known key fobs include a two-part plastic housing containing a circuit board and a rubber switch pad. One of the housing halves includes through holes through which a user may press on the rubber switch pad which, in turn, engages a switchable device on the circuit board to thereby cause the circuit board to transmit a selected signal.

One problem with known key fobs is that the plastic housing may break due to brittleness or excessive force. Another problem is that assembly is somewhat labor intensive because the two housing halves, the switch pad and the circuit board must be aligned before the two housing halves may be mated together.

What is needed in the art is a key fob that is not subject to breakage due to brittleness. What is also needed in the art is a key fob that may be easily assembled without having to align multiple components.

SUMMARY OF THE INVENTION

The present invention provides a key fob including a flexible covering that is not subject to breakage. The present invention also provides a key fob that may be easily assembled without having to align multiple components.

According to one embodiment of the invention, a key fob for keyless entry into an automobile includes a substantially rigid housing having an outer surface with a ridge or a recess. Signal transmission circuitry is disposed within the housing and is operable to transmit a signal to the automobile. A flexible shell includes a cavity in which the housing is at least partially received. A rim is engaged with the ridge or recess of the housing such that the shell is secured to the housing.

According to another embodiment of the present invention, a key fob for keyless entry into an automobile includes a substantially rigid housing having one of a projection and a recess. Signal transmission circuitry is disposed within the housing and is operable to transmit a signal to the automobile. A flexible shell includes a cavity in which the housing is at least partially received. The shell also includes an other of the projection and the recess. The projection is received in the recess such that the housing and the shell are in snap-fit engagement.

According to yet another embodiment of the present invention, a key fob for keyless entry into an automobile includes a substantially rigid housing. Signal transmission circuitry is disposed within the housing. The circuitry includes a signal-initiating arrangement operable to initiate transmission of a signal to the automobile. A flexible shell includes a cavity in which the housing is completely received. A user-actuatable element is disposed in association with the signal-initiating arrangement of the signal transmission circuitry. The user-actuatable element operates the signal-initiating arrangement.

An advantage of the present invention is that the flexible rubber shell that provides a majority of the outer surface of the key fob is not subject to breakage.

Another advantage is that the housing may be easily inserted into and secured to the flexible rubber shell.

Yet another advantage is that the housing is a single piece, and thus the need for an additional component as provided by a two-part housing has been eliminated.

A further advantage is that the circuit board is securely retained within the housing.

BRIEF DESCRIPTION OF THE DRAWINGS

The present invention will now be described, by way of example, with reference to the accompanying drawings, in which.

Figure 1:
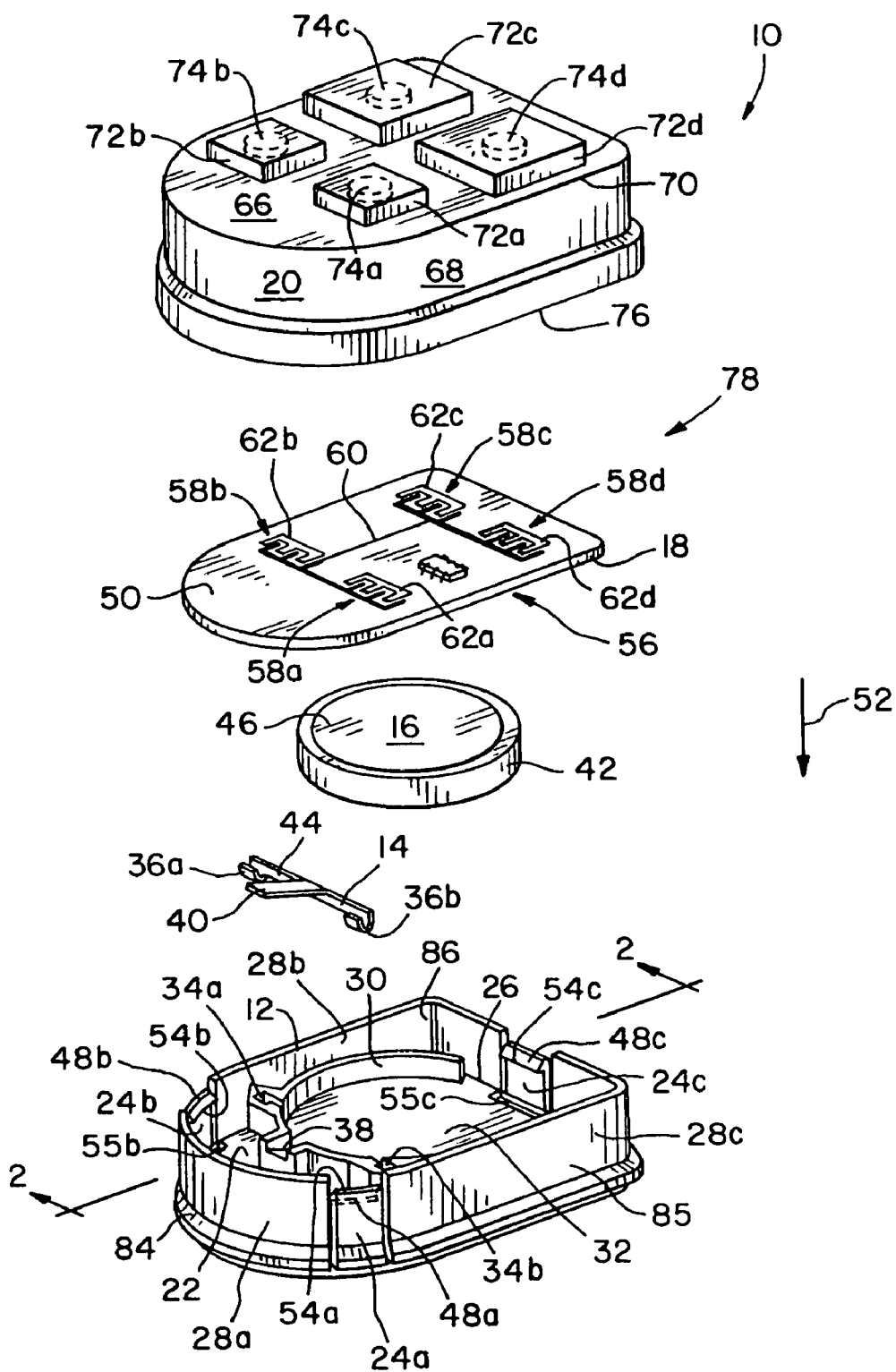
FIG. 1 is an exploded, downward perspective view of one embodiment of a key fob of the present invention.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate an embodiment of the invention and such exemplifications are not to be construed as limiting the scope of the invention in any manner.

DESCRIPTION OF INVENTION

Referring now to the drawings, and particularly to FIG. 1, there is shown one embodiment of a key fob 10 of the present invention for keyless entry into an automobile or other vehicle. Fob 10 includes a housing 12, an electrically conductive spring 14, a battery 16, a double-sided circuit board 18, and a shell 20.

Housing 12 may be monolithically formed of a rigid material, such as a plastic material, in order to protect the housing's contents from damage. More particularly, spring 14, battery 16, and circuit board 18 may be disposed within housing 12, and may be protected from damage thereby. Housing 12 may include a planar base 22 and three retaining clips 24a, 24b, 24c extending at a right angle from a perimeter 26 of base 22. Retaining clips 24a, 24b, 24c retain circuit board 18 in housing 12, as discussed in more detail below. Three upstanding walls 28a, 28b, 28c also extend at right angles from perimeter 26 of base 22. Retaining clips 24a, 24b, 24c are interspersed between upstanding walls 28a, 28b, 28c along perimeter 26. That is, each of retaining clips 24a, 24b, 24c is disposed between a respective pair of the three upstanding walls 28a, 28b, 28c.

Also extending at a right angle from base 22 of housing 12 is a battery-retaining wall 30 defining a space 32 in which battery 16 may be retained. Wall 30 includes slots 34a, 34b for receiving opposite ends 36a, 36b, respectively, of spring 14. Wall 30 also includes a notch 38 through which an electrical contact 40 of spring 14 extends.

Opposite ends 36a, 36b of spring 14 may be in the form of U-shaped springs for retaining spring 14 within slots 34a, 34b. During assembly, battery 16 may be inserted into area 32 such that an outer edge 42 of a positive-voltage portion of battery 16 is pressed against a body 44 of spring 14. After battery 16 is released by the assembly worker, spring 14 biases battery 16 against retaining clip 24c, portions of upstanding walls 28b, 28c that are adjacent to retaining clip 24c, and/or against portions of retaining wall 30 that are nearest to retaining clip 24c. Thus, battery 16 is securely held within housing 12.

Figure 2:
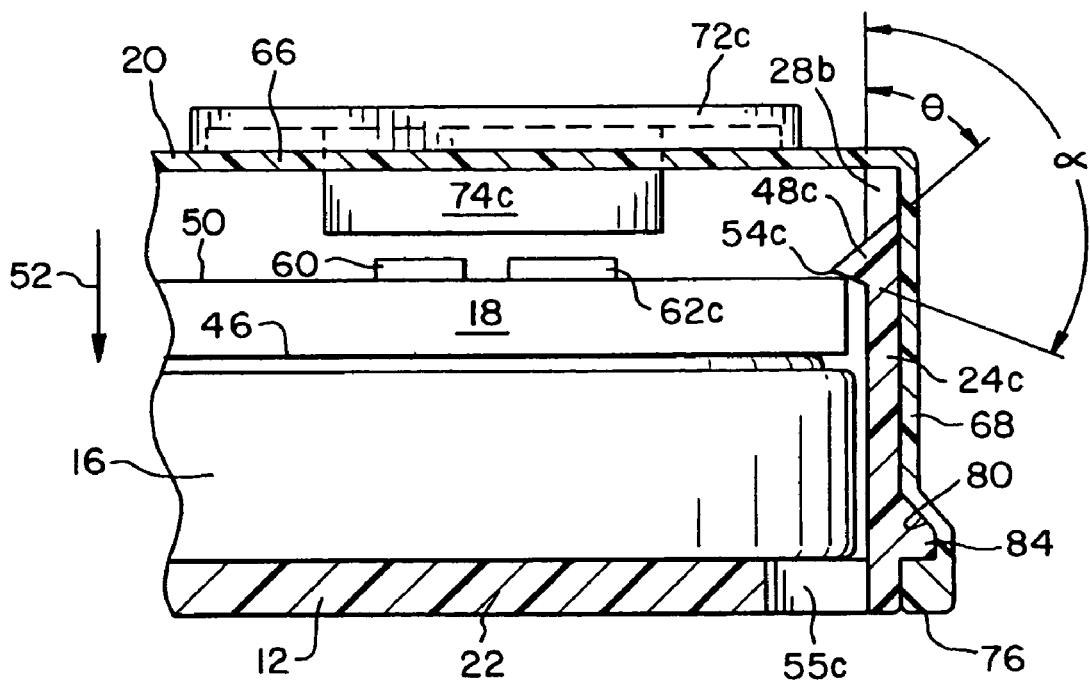
FIG. 2 is a fragmentary, cross-sectional view of the key fob of FIG. 1 in an assembled state, along line 2-2.

Circuit board 18 may be inserted into housing 12 such that circuit board 18 is supported by a top surface 46 of a grounded portion of battery 16 and is retained in housing 12 by retaining clips 24a, 24b, 24c. Each retaining clip 24a, 24b, 24c includes a respective dog 48a, 48b, 48c for engaging a top surface 50 of circuit board 18 and biasing circuit board 18 toward battery 16. FIG. 2 illustrates dog 48c engaging and biasing board 18 against battery 16. Although housing 12 may be formed of a substantially rigid material, such as a polymer (e.g., polyethylene), the material of housing 12 may be flexible enough that retaining clips 24 flex outwardly as circuit board 18 is pushed downwardly (in the direction indicated by arrow 52) against dogs 48. Once top surface 50 of board 18 has moved past distal tips 54a, 54b, 54c of dogs 48, retaining clips 24 may flex back inwardly such that the lower surfaces of dogs 48 engage top surface 50, as shown in FIG. 2. In one embodiment, an angle θ between the top surface of dog 48 and the vertical direction is 50°, and an angle α between the bottom surface of dog 48 and the vertical direction is 110°.

Figure 3:
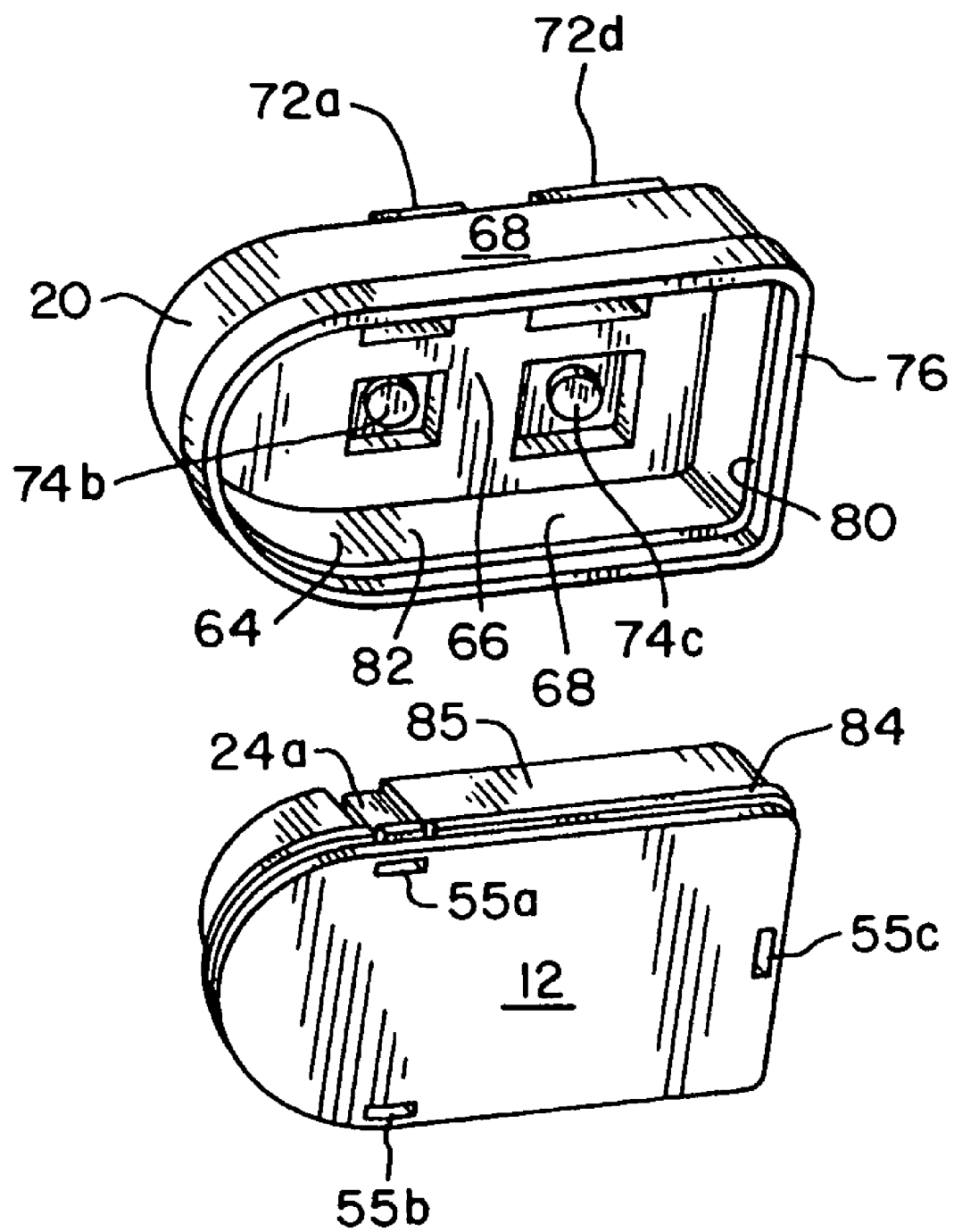
FIG. 3 is an upward perspective view of the housing and shell of FIG. 1.

Retaining clips 24 may be attached to the remainder of housing 12 only at their bottom ends, thereby providing retaining clips 24 with a degree of flexibility. As best seen in FIG. 3, housing 12 may also be provided with through-slots 55a, 55b, 55c at the bottoms of retaining clips 24 in order to improve the flexibility of retaining clips 24.

When circuit board 18 is retained in housing 12 by clips 24, contact 40 of spring 14, which is electrically connected to the positive voltage of battery 16, engages a contact pad (not shown) on the underside of circuit board 18. Moreover, grounded top surface 46 of battery 16 engages another contact pad (not shown) on the underside of circuit board 18. Thus, battery 16 is electrically connected to and provides power to circuit board 18 through spring 14.

Circuit board 18 includes signal transmission circuitry 56 that may be operable to transmit radio frequency signals to a receiver (not shown) on an automobile or the like. Signal transmission circuitry 56 includes signal-initiating arrangements 58a, 58b, 58c, 58d, each of which is operable to initiate the transmission of a respective signal. In the embodiment shown, signal-initiating arrangements 58a, 58b, 58c, 58d include a common ground line 60 and respective positive contacts 62a, 62b, 62c, 62d. Electrically connecting one of positive contacts 62a, 62b, 62c, 62d to ground line 60, as described in more detail below, initiates transmission of a respective signal.

Shell 20 may be formed of a flexible material such as silicone rubber. Shell 20 may include a switch pad or button pad 66 and a continuous side wall 68 attached to an edge 70 of button pad 66. As shown in FIG. 3, button pad 66 and side wall 68 define a cavity 64, which may be sized to completely receive housing 12 along with spring 14, battery 16 and circuit board 18. That is, a subassembly 78 including housing 12, spring 14, battery 16 and circuit board 18 may be disposed entirely to one side of a plane defined by a rim 76 of shell 20 when subassembly 78 has been inserted into cavity 64.

Button pad 66 includes user-actuatable elements in the form of buttons 72a, 72b, 72c, 72d each having a respective electrically conductive connector 74a, 74b, 74c, 74d facing cavity 64. When subassembly 78 has been placed in cavity 64, each of buttons 72a, 72b, 72c, 72d is disposed in association with a respective one of signal-initiating arrangements 58a, 58b, 58c, 58d. More particularly, each of buttons 72a, 72b, 72c, 72d may be disposed adjacent to a respective one of signal-initiating arrangements 58a, 58b, 58c, 58d.

When a user actuates one of buttons 72a, 72b, 72c, 72d by pressing the button in direction 52, the respective one of electrically conductive connectors 74a, 74b, 74c, 74d engages and thereby operates a respective one of signal-initiating arrangements 58a, 58b, 58c, 58d. More particularly, the respective one of electrically conductive connectors 74a, 74b, 74c, 74d interconnects the respective one of positive contacts 62a, 62b, 62c, 62d with ground line 60. For example, as best shown in FIG. 2, depressing button 72c in direction 52 causes connector 74c to electrically interconnect positive contact 62c with ground line 60. Each of positive contacts 62a, 62b, 62c, 62d may be coupled with a respective transistor (not shown) such that electrically connecting the positive contact with ground line 60 may cause a respective signal to be transmitted.

Shell 20 may include a recess in the form of a continuous groove 80 on an inside surface 82 of side wall 68. Groove 80 may extend continuously around the entire perimeter of shell 20. Groove 80 may receive a projection in the form of a continuous ridge 84 on an outer surface 85 of housing 12 when subassembly 78 is fully inserted into cavity 64. Ridge 84 may extend continuously around the entire perimeter of housing 12. As best shown in FIG. 2, groove 80 may have a shape and size that is complementary to ridge 84 such that there may be few if any air gaps between ridge 84 and shell 20. Moreover, the sizes and shapes of groove 80 and ridge 84 may be such that housing 12 and shell 20 are in snap-fit engagement when ridge 84 is received in groove 80. In the embodiment shown in FIG. 2, both groove 80 and ridge 84 include arcuate sections and a linear section that is horizontally oriented, i.e., oriented perpendicular to downward direction 52.

The combination of ridge 84 and groove 80 may function to secure shell 20 to housing 12 such that shell 20 cannot easily slide off of housing 12 or otherwise be inadvertently removed. However, it is possible for a user to intentionally remove shell 20 from housing 12, such as in order to replace battery 16, by peeling shell 20 away from ridge 84.

The combination of ridge 84 and groove 80 may also function to seal and protect battery 16 and circuit board 18 from water and other elements of the outside environment. More particularly, when subassembly 78 is disposed in cavity 64, shell 20 may seal an open top 86 of housing 12. Open top 86 is defined by the top edges of retaining clips 24a, 24b, 24c and the top edges of upstanding walls 28a, 28b, 28c. It is possible for ridge 84 and groove 80 to hermetically seal open top 86 of housing 12 from the outside environment.

Figure 4:
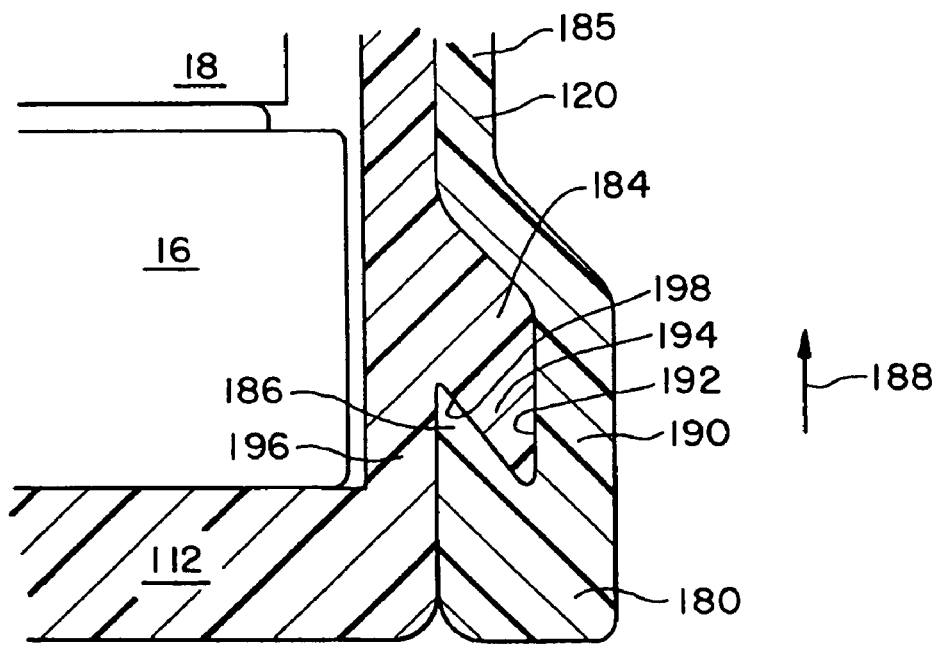
FIG. 4 is an enlarged, fragmentary, cross-sectional view of another embodiment of the key fob of the present invention.

In another embodiment (FIG. 4), a shell 120 and a housing 112 include complementary and interlocking hook-shaped devices 180 and 184, respectively. Hook-shaped devices 180 and 184 may extend continuously around shell 120 and housing 112, respectively. Moreover, hook-shaped devices 180 and 184 may have constant cross sections, similar to as shown in FIG. 4, throughout their circuits.

Hook-shaped device 180 may be attached to a distal end of a side wall 185 of shell 120 and may have a projection in the form of a crotchet 186 extending in a generally upward direction indicated by arrow 188. Crotchet 186 and a body 190 of hook-shaped device 180 define therebetween a recess in the form of a continuous groove 192.

Hook-shaped device 184 may have a structure that is similar to and complementary to that of hook-shaped device 180. More particularly, hook-shaped device 184 may have a projection in the form of a crotchet 194 extending in a generally downward direction that is opposite to direction 188. Crotchet 194 and a body 196 of hook-shaped device 184 define therebetween a recess in the form of a continuous groove 198.

Shell 120 is flexible and/or stretchable enough that crotchet 186 may be inserted into groove 198 during assembly. Thus, hook-shaped device 180 may be engaged with groove 198 such that shell 120 is secured to housing 112. Beside fastening shell 120 and housing 112 together, the cooperation of hook-shaped devices 180, 184 may also function to seal housing 112 from outside elements, such as water. Other details of housing 112 and shell 120 are substantially similar to those of housing 12 and shell 20 as described above, and thus are not discussed in detail herein.

In another embodiment (not shown), the shell does not include an open bottom defined by a rim. Rather, the shell has a bottom, horizontally oriented wall attached to the bottom of the shell's side wall all the way along the side wall's circuit. The bottom wall may have a throughhole or slit therein to allow the subassembly including the housing, spring, battery and circuit board to be inserted into the shell's cavity. The bottom wall may function to retain the subassembly within the shell cavity. Thus, in this embodiment, the interlocking projection and recess of the shell and housing may not be needed to retain the subassembly in the shell cavity.

The shell has been described herein as including user-actuatable elements in the form of buttons for operating a signal-initiating arrangement. However, it is to be understood that the user-actuatable elements do not have to be in the form of buttons that are raised above the base surface of the button pad. That is, the user-actuatable elements may be in the form of predetermined areas of a button pad that are flush with the base surface of the button pad. Thus, the button pad may provide a substantially flat, continuous, possibly two-dimensional surface. Actuation of the predetermined areas of the button pad may result in the predetermined areas being depressed below the base surface of the button pad.

Moreover, it is within the scope of the present invention for the signal-initiating arrangements to be activated by something other than actuatable elements. That is, the signal-initiating arrangements may be activated without any actuation or movement of any part of the fob. For example, the shell and/or the signal transmission circuitry may include pressure-sensitive or heat-sensitive elements that may sense a user's finger(s) being pressed or being present in certain areas of the shell. The signal-initiating arrangements could then be activated in response to the user's finger(s) being sensed.

The embodiments disclosed above are not intended to be exhaustive or to limit the invention to the precise forms disclosed in the detailed description. Rather, the embodiments have been chosen and described so that others skilled in the art may utilize their teachings.

Although described in the exemplary embodiments, it will be understood that various modifications may be made to the subject matter without departing from the intended and proper scope of the invention.

The invention claimed is:

1. A key fob for keyless entry into an automobile, comprising:
a substantially rigid open-topped housing including a base portion, a plurality of upstanding peripheral wall segments and a plurality of upstanding peripheral cantilevered retaining clips integrally formed with said base portion and alternatingly interspaced with said wall segments, said wall segments and retaining clips cooperating to define an outer peripheral surface having a radially outwardly directed, circumferentially extending ridge integrally formed thereon, and each said retaining clip having a radially inwardly directed catch feature integrally formed near a free end thereof;
signal transmission circuitry disposed within said housing and operable to transmit a signal to the automobile, said circuitry including a generally planer circuit board retentively engaged by said clip catch features; and
a flexible shell formed of resilient elastomeric material including:
a button pad closing the open top of said housing and defining the uppermost outer surface of said key fob;
a continuous peripheral sidewall integrally formed with said switch pad and dimensioned to elastically embrace the outer peripheral surface of said housing to continuously urge said retaining clips radially inwardly into engagement with said circuit board;
a cavity in which said housing is at least partially received; and
a radially inwardly directed, circumferentially extending continuous rim integrally formed on an inner surface of said sidewall engaged with the ridge of said housing such that said shell is interlocked to said housing, establishing a seal therebetween.

2. The key fob of claim 1, wherein said ridge of said housing comprises a substantially continuous groove or projection extending circumferentially around said housing.

3. The key fob of claim 1, wherein said shell is formed of silicone rubber.

4. The key fob of claim 1, wherein said housing is entirely disposed within said cavity of said shell.

5. The key fob of claim 1, wherein said signal transmission circuitry includes a signal-initiating arrangement operable to initiate transmission of the signal to the automobile, said shell including a user-actuatable element disposed in association with said signal-initiating arrangement of said signal transmission circuitry, said user-actuatable element being configured to operate said signal-initiating arrangement.

6. The key fob of claim 1, further comprising a localized thinned section formed in said housing base portion adjacent a point of attachment of at least one of said cantilevered retaining clips to enhance radial flexibility thereof.

7. The key fob of claim 2, wherein said rim extends substantially continuously around said shell.

8. The key fob of claim 5, wherein said shell includes:
user-actuatable element is disposed on said button pad; and
said side wall is attached to an edge of said button pad, wherein said rim is attached to a distal end of said side wall.

9. The key fob off claim 5, wherein said signal-initiating arrangement is disposed on said circuit board.

10. A key fob assembly comprising:
a substantially rigid inner housing comprising a generally planar base portion and an integral upstanding peripheral wall defining an open-topped cavity configured to nestingly retain a radio frequency transmitter circuit board therein including a plurality of exposed switch contacts, said peripheral wall formed by a plurality of upstanding peripheral wall segments and a plurality of upstanding peripheral cantilevered retaining clips integrally formed with said base portion and alternatingly interspaced with said wall segments, said wall segments and retaining clips cooperating to define an outer peripheral surface having a radially outwardly directed, circumferentially extending ridge integrally formed thereon, and each said retaining clip having a radially inwardly directed catch feature integrally formed near a free end thereof;

a flexible shell formed of resilient elastomeric material comprising a generally planar switch pad portion defining the uppermost outer surface of said key fob and an integral downwardly directed circumferentially continuous peripheral sidewall dimensioned to elastically embrace the entire outer peripheral surface of said housing to continuously urge said retaining clips radially inwardly into engagement with said circuit board, said switch pad and sidewall configured to sealingly enclose said open-topped cavity and engage the outer peripheral surface of said housing wall, the circumferentially extending radially directed ridge or recess integrally formed by the outer surface of said housing peripheral sidewall configured to matingly engage a circumferentially continuous radially inwardly directed rim integrally formed on an inner surface of said shell sidewall to effect locking engagement of said shell and inner housing; and at least one electrical connector carried on an inner surface of said switch pad portion in aligned spaced relation with said switch contacts and operable, upon manual displacement of an adjacent region of said switch pad portion to affect electrical interconnection of said switch contacts to actuate an electrical circuit carried with said radio frequency transmitter circuit board.

11. The key fob assembly of claim 10, wherein said shell switch pad defines at least one faux push button integrally formed in the switch pad portion.

12. The key fob assembly of claim 10, wherein said shell switch pad, peripheral sidewall and continuous rim are entirely composed of resilient elastomeric material such as silicone rubber.

13. The key fob assembly of claim 10, further comprising a localized through-passage formed in said housing base portion adjacent a point of attachment of at least one of said cantilevered retaining clips to enhance radial flexibility thereof.

14. The key fob assembly of claim 11, wherein said at least one faux push button forms a recess or pocket on the inner surface of the switch pad portion mountingly receiving said at least one electrical connector.

15. A key fob assembly for keyless entry into an automobile:

a substantially rigid housing member formed as a single unitary structure front injection molded polymer based material, said housing member including a substantially planar base portion, an integral upstanding peripheral wall defining an open-topped cavity composed of a plurality of upstanding peripheral wall segments, a plurality of peripheral cantilevered retaining clips depending upwardly from said base portion and alternatingly interspaced with said wall segments, at least one through slot formed in said base portion adjacent an associated one of said retaining clips, and an integral inner battery retaining wall extending upwardly from said base portion, said wall seaments and retaining clips cooperating to define an outer peripheral surface having a radially outwardly directed, circumferentially extending ridge or recess integrally formed thereon, and each retaining clip having a radially inwardly directed catch feature integrally formed near a free end thereof;

a battery nestingly received within said battery retaining wall with at least one electrical terminal thereof facing upwardly;

a dual-sided radio frequency transmitter printed circuit board assembly nestingly received within said open-topped cavity and retained within said housing member by said retaining clip catch features, said peripheral wall and said battery retaining wall, said printed circuit board including at least one downwardly facing power contact registering with said battery terminal for providing electrical power to said printed circuit board and a plurality of upwardly facing switch contacts;

a flexible shell formed of resilient elastomeric material as a unitary structure to substantially close said open-topped housing member, said shell including a generally planar switch pad portion and defining the uppermost surface of said key fob, and an integral downwardly directed circumferentially continuous peripheral sidewall configured to sealingly enclose said open-topped cavity and elastically embrace the outer peripheral surface of said housing wall to continuously urge said retaining clips radially inwardly into engagement with saif circuit board, said shell further including at least one faux switch button extending upwardly from said switch pad portion and generally registering with said upwardly facing switch contacts;

the circumferentially extending radially directed ridge or recess formed by the outer surface of said housing peripheral sidewall configured to matingly engage a circumferentially continuous radially inwardly directed rim formed on an inner surface of said shell sidewall to effect locking engagement of said shell and inner housing; and at least one electrical switch connector carried on an inner surface of said switch pad portion, the at least one faux switch button of said switch pad portion in aligned spaced relation with said switch contacts and operable, upon manual displacement of faux switch button to affect electrical interconnection of said switch contacts to actuate an electrical circuit carried with said radio frequency transmitter circuit board, wherein the switch pad portion of said shell is fully exposed to an operator and said shell is retained exclusively by said open-topped housing member.

16. The key fob assembly of claim 15, further comprising a localized through-slot formed in said housing base portion adjacent a point of attachment of at least one of said cantilevered retaining clips to enhance radial flexibility thereof.

* * * * *